(12) United States Patent
Wollrath et al.

(10) Patent No.: US 6,487,607 B1
(45) Date of Patent: *Nov. 26, 2002

(54) METHODS AND APPARATUS FOR REMOTE METHOD INVOCATION

(75) Inventors: Ann M. Wollrath, Groton; Peter C. Jones, Winchester, both of MA (US)

(73) Assignee: Sun Microsystems, Inc., Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/044,938

(22) Filed: Mar. 20, 1998

Related U.S. Application Data

(60) Provisional application No. 60/076,048, filed on Feb. 26, 1998.

(51) Int. Cl.[7] ............................................. G06F 13/00
(52) U.S. Cl. ..................................................... 709/330
(58) Field of Search ................................ 709/320, 321, 709/322, 323, 327, 328, 330

(56) References Cited

U.S. PATENT DOCUMENTS

| | | | |
|---|---|---|---|
| 4,430,699 A | 2/1984 | Segarra et al. | 709/230 |
| 4,491,946 A | 1/1985 | Kryskow, Jr. et al. | 370/453 |
| 4,558,413 A | 12/1985 | Schmidt et al. | 707/203 |
| 4,713,806 A | 12/1987 | Oberlander et al. | 370/358 |
| 4,809,160 A | 2/1989 | Mahon et al. | 713/200 |
| 4,823,122 A | 4/1989 | Mann et al. | 340/825.28 |
| 4,939,638 A | 7/1990 | Stephenson et al. | 710/244 |
| 4,956,773 A | 9/1990 | Saito et al. | 717/3 |
| 5,088,036 A | 2/1992 | Ellis et al. | 707/206 |
| 5,109,486 A | 4/1992 | Seymour | 709/224 |
| 5,187,787 A | 2/1993 | Skeen et al. | 709/314 |
| 5,218,699 A | 6/1993 | Brandle et al. | 709/328 |
| 5,257,369 A | 10/1993 | Skeen et al. | 709/312 |
| 5,293,614 A | 3/1994 | Ferguson et al. | 707/201 |
| 5,297,283 A | 3/1994 | Kelly et al. | 709/104 |
| 5,307,490 A | 4/1994 | Davidson et al. | 709/328 |
| 5,311,591 A | 5/1994 | Fischer | 713/156 |
| 5,339,435 A | 8/1994 | Lubkin et al. | 717/11 |
| 5,386,568 A | 1/1995 | Wold et al. | 717/10 |
| 5,390,328 A | 2/1995 | Frey et al. | 709/315 |
| 5,392,280 A | 2/1995 | Zheng | 370/353 |
| 5,423,042 A | 6/1995 | Jalili et al. | 709/328 |
| 5,440,744 A | 8/1995 | Jacobson et al. | 709/203 |
| 5,448,740 A | 9/1995 | Kiri et al. | 717/8 |
| 5,452,459 A | 9/1995 | Drury et al. | 707/3 |
| 5,455,952 A | 10/1995 | Gjovaag | 717/1 |
| 5,471,629 A | 11/1995 | Risch | 707/201 |
| 5,475,792 A | 12/1995 | Stanford et al. | 704/233 |
| 5,475,817 A | 12/1995 | Waldo et al. | 709/316 |

(List continued on next page.)

FOREIGN PATENT DOCUMENTS

| | | |
|---|---|---|
| EP | 0 300 516 A | 1/1989 |
| EP | 0 351 536 A3 | 1/1990 |
| EP | 0 384 339 A | 2/1990 |

(List continued on next page.)

OTHER PUBLICATIONS

Java Remote Method Invocation Specification, Feb. 10, 1997, Sun Microsystems, pp. 19–21.

(List continued on next page.)

*Primary Examiner*—Kenneth R. Coulter
(74) *Attorney, Agent, or Firm*—Finnegan, Henderson, Farabow, Garrett & Dunner, L.L.P.

(57) ABSTRACT

Remote method invocation using a generic proxy class. A client machine transmits a call for invocation of a method of a remote object including an identifier for the method object. A server machine receives the identifier and uses generic code to invoke the method object and return an indication of the invoked method along with any relevant parameters.

25 Claims, 7 Drawing Sheets

U.S. PATENT DOCUMENTS

| | | | | |
|---|---|---|---|---|
| 5,481,721 | A | 1/1996 | Serlet et al. | 709/315 |
| 5,504,921 | A | 4/1996 | Dev et al. | 709/223 |
| 5,511,197 | A | 4/1996 | Hill et al. | 709/328 |
| 5,524,244 | A | 6/1996 | Robinson et al. | 717/5 |
| 5,548,726 | A | 8/1996 | Pettus | 709/221 |
| 5,553,282 | A | 9/1996 | Parrish et al. | 707/10 |
| 5,555,367 | A | 9/1996 | Premerlani et al. | 707/4 |
| 5,555,427 | A | 9/1996 | Aoe et al. | 709/201 |
| 5,557,798 | A | 9/1996 | Skeen et al. | 705/35 |
| 5,560,003 | A | 9/1996 | Nilsen et al. | 707/206 |
| 5,561,785 | A | 10/1996 | Blandy et al. | 711/170 |
| 5,577,231 | A | 11/1996 | Scaizi et al. | 703/26 |
| 5,594,921 | A | 1/1997 | Pettus | 710/11 |
| 5,603,031 | A | 2/1997 | White et al. | 709/317 |
| 5,617,537 | A | 4/1997 | Yamada et al. | 709/214 |
| 5,628,005 | A | 5/1997 | Hurvig | 707/8 |
| 5,640,564 | A | 6/1997 | Hamilton et al. | 709/315 |
| 5,644,768 | A | 7/1997 | Periwal et al. | 709/102 |
| 5,652,888 | A | 7/1997 | Burgess | 709/318 |
| 5,655,148 | A | 8/1997 | Richman et al. | 710/8 |
| 5,659,751 | A | 8/1997 | Heninger | 709/332 |
| 5,671,225 | A | 9/1997 | Hooper et al. | 370/468 |
| 5,675,796 | A | 10/1997 | Hodges et al. | 709/100 |
| 5,675,797 | A | 10/1997 | Chung et al. | 709/104 |
| 5,680,573 | A | 10/1997 | Rubin et al. | 711/129 |
| 5,680,617 | A | 10/1997 | Gough et al. | 707/104 |
| 5,684,955 | A | 11/1997 | Meyer et al. | 709/316 |
| 5,689,709 | A | 11/1997 | Corbett et al. | 709/315 |
| 5,706,435 | A | 1/1998 | Barbara | 711/141 |
| 5,706,502 | A | 1/1998 | Foley et al. | 707/10 |
| 5,724,588 | A | 3/1998 | Hill et al. | 709/328 |
| 5,727,145 | A | 3/1998 | Nessett et al. | 713/200 |
| 5,737,607 | A | 4/1998 | Hamilton et al. | 717/1 |
| 5,745,678 | A | 4/1998 | Herzberg et al. | 713/200 |
| 5,745,695 | A | 4/1998 | Gilchrist et al. | 709/227 |
| 5,745,703 | A | 4/1998 | Cetjin et al. | 709/238 |
| 5,745,755 | A | 4/1998 | Covey | 707/203 |
| 5,748,897 | A | 5/1998 | Katiyar | 709/219 |
| 5,754,849 | A | 5/1998 | Dyer et al. | 707/101 |
| 5,757,925 | A | 5/1998 | Faybishenko | 709/203 |
| 5,758,344 | A | 5/1998 | Prasad et al. | 707/10 |
| 5,761,656 | A | 6/1998 | Ben-Schachar | 707/4 |
| 5,764,897 | A | 6/1998 | Khalidi | 709/201 |
| 5,768,532 | A | 6/1998 | Megerian | 709/245 |
| 5,774,551 | A | 6/1998 | Wu et al. | 713/155 |
| 5,778,187 | A | 7/1998 | Monteiro et al. | 709/231 |
| 5,778,228 | A | 7/1998 | Wei | 709/328 |
| 5,778,368 | A | 7/1998 | Hogan et al. | 707/10 |
| 5,784,560 | A | 7/1998 | Kingdon et al. | 709/201 |
| 5,787,425 | A | 7/1998 | Bigus | 707/6 |
| 5,787,431 | A | 7/1998 | Shaughnessy | 707/100 |
| 5,790,548 | A | 8/1998 | Sistanizadeh et al. | 370/401 |
| 5,802,367 | A | 9/1998 | Held et al. | 709/332 |
| 5,808,911 | A | 9/1998 | Tucker et al. | 709/316 |
| 5,809,507 | A | 9/1998 | Cavanaugh, III | 707/103 |
| 5,812,819 | A | 9/1998 | Rodwin et al. | 703/23 |
| 5,813,013 | A | 9/1998 | Shakib et al. | 707/102 |
| 5,815,149 | A | 9/1998 | Mutschler, III et al. | 345/335 |
| 5,815,709 | A | 9/1998 | Waldo et al. | 712/300 |
| 5,815,711 | A | 9/1998 | Sakamoto et al. | 717/1 |
| 5,818,448 | A | 10/1998 | Katiyar | 709/203 |
| 5,829,022 | A | 10/1998 | Watanabe et al. | 711/118 |
| 5,832,219 | A | 11/1998 | Pettus | 709/203 |
| 5,832,529 | A | 11/1998 | Wollrath et al. | 707/206 |
| 5,832,593 | A | 11/1998 | Wurst | 29/750 |
| 5,835,737 | A | 11/1998 | Sand et al. | 710/113 |
| 5,842,018 | A | 11/1998 | Atkinson et al. | 707/501 |
| 5,844,553 | A | 12/1998 | Hao et al. | 345/329 |
| 5,845,090 | A | 12/1998 | Collins, III et al. | 709/221 |
| 5,845,129 | A | 12/1998 | Wendorf et al. | 710/200 |
| 5,860,004 | A | 1/1999 | Fowlow et al. | 717/1 |
| 5,860,153 | A | 1/1999 | Matena et al. | 711/216 |
| 5,864,862 | A | 1/1999 | Kriens et al. | 707/103 |
| 5,864,866 | A | 1/1999 | Henckel et al. | 707/103 |
| 5,872,928 | A | 2/1999 | Lewis et al. | 709/222 |
| 5,872,973 | A | 2/1999 | Mitchell et al. | 709/332 |
| 5,875,335 | A | 2/1999 | Beard | 717/5 |
| 5,878,411 | A | 3/1999 | Borroughs et al. | 707/4 |
| 5,884,024 | A | 3/1999 | Lim et al. | 713/201 |
| 5,884,079 | A | 3/1999 | Furusawa | 717/1 |
| 5,887,134 | A | 3/1999 | Ebrahim | 709/200 |
| 5,889,951 | A | 3/1999 | Lombardi | 709/219 |
| 5,890,158 | A | 3/1999 | House et al. | 707/10 |
| 5,892,904 | A | 4/1999 | Atkinson et al. | 713/201 |
| 5,913,029 | A | 6/1999 | Shostak | 709/203 |
| 5,933,497 | A | 8/1999 | Beetcher et al. | 705/59 |
| 5,933,647 | A | 8/1999 | Aronberg et al. | 717/178 |
| 5,935,249 | A | 8/1999 | Stern et al. | 713/201 |
| 5,940,827 | A | 8/1999 | Hapner et al. | 707/8 |
| 5,944,793 | A | 8/1999 | Islam et al. | 709/220 |
| 5,946,485 | A | 8/1999 | Weeren et al. | 717/3 |
| 5,946,694 | A | 8/1999 | Copeland et al. | 707/103 |
| 5,949,998 | A | 9/1999 | Fowlow et al. | 717/105 |
| 5,951,652 | A | 9/1999 | Ingrassia, Jr. et al. | 709/248 |
| 5,956,509 | A | 9/1999 | Kevner | 709/330 |
| 5,963,947 | A | 10/1999 | Ford et al. | 707/10 |
| 5,966,531 | A | 10/1999 | Skeen et al. | 709/315 |
| 5,969,967 | A | 10/1999 | Aahlad et al. | 700/2 |
| 5,974,201 | A | 10/1999 | Chang et al. | 382/305 |
| 5,978,484 | A | 11/1999 | Apperson et al. | 705/54 |
| 5,987,506 | A | 11/1999 | Carter et al. | 709/213 |
| 5,999,179 | A | 12/1999 | Kekic et al. | 345/734 |
| 5,999,988 | A | 12/1999 | Pelegri-Llopart et al. | 709/330 |
| 6,003,763 | A | 12/1999 | Gallagher et al. | 235/379 |
| 6,009,103 | A | 12/1999 | Woundy | 370/401 |
| 6,016,496 | A | 1/2000 | Roberson | 707/103 R |
| 6,016,516 | A | 1/2000 | Horikiri | 709/330 |
| 6,023,586 | A | 2/2000 | Gaisford et al. | 717/178 |
| 6,026,414 | A | 2/2000 | Anglin | 707/204 |
| 6,031,977 | A | 2/2000 | Pettus | 709/230 |
| 6,032,151 | A | 2/2000 | Arnold et al. | 707/103 R |
| 6,044,381 | A | 3/2000 | Boothby et al. | 707/201 |
| 6,049,673 | A | 4/2000 | McComb et al. | |
| 6,052,761 | A | 4/2000 | Hornung et al. | 711/141 |
| 6,058,383 | A | 5/2000 | Narasimhalu et al. | 705/44 |
| 6,061,699 | A | 5/2000 | DiCecco et al. | 707/513 |
| 6,061,713 | A | 5/2000 | Bharadhwaj | 709/203 |
| 6,067,575 | A | 5/2000 | McManis et al. | 709/313 |
| 6,085,255 | A | 7/2000 | Vincent et al. | 709/238 |
| 6,108,346 | A | 8/2000 | Doucette et al. | 370/450 |
| 6,134,603 | A | 10/2000 | Jones et al. | 709/330 |
| 6,182,083 | B1 | 1/2001 | Scheifler et al. | 707/103 R |
| 6,185,602 | B1 | 2/2001 | Bayrakeri | 709/204 |
| 6,185,611 | B1 | 2/2001 | Waldo et al. | 709/221 |
| 6,216,138 | B1 | 4/2001 | Wells et al. | 707/502 |
| 6,226,746 | B1 | 5/2001 | Scheifler | 713/200 |
| 6,247,091 | B1 | 6/2001 | Lovett | 710/260 |
| 6,263,379 | B1 * | 7/2001 | Atkinson et al. | 709/332 |
| 6,282,295 | B1 | 8/2001 | Young et al. | 380/286 |
| 6,282,568 | B1 | 8/2001 | Sondur et al. | 709/223 |
| 6,339,783 | B1 | 1/2002 | Horikiri | 709/203 |

FOREIGN PATENT DOCUMENTS

| | | |
|---|---|---|
| EP | 0 472 874 A1 | 3/1992 |
| EP | 0 474 340 A | 3/1992 |
| EP | 497 022 A1 | 8/1992 |
| EP | 0 555 997 A | 8/1993 |
| EP | 0 565 849 A | 10/1993 |
| EP | 0 569 195 A2 | 11/1993 |
| EP | 0 625 750 A | 11/1994 |
| EP | 0 635 792 A | 1/1995 |

| | | |
|---|---|---|
| EP | 0 651 328 A | 5/1995 |
| EP | 0 660 231 A | 6/1995 |
| EP | 0 718 761 A | 12/1995 |
| EP | 0 697 655 A2 | 2/1996 |
| EP | 0 767 432 A2 | 4/1997 |
| EP | 0 810 524 A | 5/1997 |
| EP | 0 778 520 A2 | 6/1997 |
| EP | 0 794 493 A2 | 10/1997 |
| EP | 0 803 810 A2 | 10/1997 |
| EP | 0 803 811 A | 10/1997 |
| EP | 0 805 393 A2 | 11/1997 |
| EP | 0 817 020 A2 | 1/1998 |
| EP | 0 817 022 A2 | 1/1998 |
| EP | 0 817 025 A | 1/1998 |
| EP | 0 836 140 A2 | 4/1998 |
| GB | 2 253 079 A | 8/1992 |
| GB | 0 262 825 A | 6/1993 |
| GB | 2 305 087 A | 3/1997 |
| JP | 11-45187 | 2/1999 |
| WO | WO92/07335 | 4/1992 |
| WO | WO92/09948 | 6/1992 |
| WO | WO93/25962 A1 | 12/1993 |
| WO | WO94/03855 A | 2/1994 |
| WO | WO96/03692 A | 2/1996 |
| WO | WO96/10787 A | 4/1996 |
| WO | WO96/18947 A | 6/1996 |
| WO | WO96/24099 A | 8/1996 |
| WO | WO98/02814 | 1/1998 |
| WO | WO98/04971 | 2/1998 |

OTHER PUBLICATIONS

Aldrich et al., "Providing Easier Access to Remote Objects in Client–Server Systems," System Sciences, 1998, Proceedings of the 31st Hawaii Internat'l. Conference, Jan. 6–9, 1998, pp. 366–375.

Aldrich et al., "Providing Easier Access to Remote Objects in Distributed Systems," Calif. Institute of Technology, www.cs.caltech.edu/%7Ejedi/paper/jedipaper.html, Nov. 21, 1997.

Dave et al., "Proxies, Application Interfaces, and Distributed Systems," XP 002009478, IEEE, pp. 212–220, Sep. 1992.

Dollimore et al., "The Design of a System for Distributing Shared Objects," The Computer Journal, No. 6, Cambridge, GB, Dec. 1991.

Fleisch et al., "High Performance Distributed Objects Using Distributed Shared Memory & Remote Method Invocation," System Sciences, 1998, Proceedings of the 31st Hawaii Internat'l. Conference, Jan. 6–9, 1998, pp. 574–578.

Guyennet et al., "A New Consistency Protocol Implemented in the CAliF System," IEEE, 1094–7256/97, pp. 82–87, 1997.

Guyennet et al., "Distributed Shared Memory Layer for Cooperative Work Applications," IEEE, 0742–1303/97, pp. 72–78, 1997.

IBM Technical Disclosure Bulletin, "Local Network Monitoring to Populate Access Agent Directory," vol. 36, No. 09A, pp. 403–405, Sep. 1993.

MUX–Elektronik, Java 1.1 Interactive Course, www.IIs.se/mux/javaic.html, 1995.

Stevenson, "Token–Based Consistency of Replicated Servers," IEEE, CH2686–4/89/0000/0179, pp.179–183, 1989.

Alexander, et al., "Active Bridging", Proceedings of the ACM/SIGCOMM'97 Conference, Cannes, France, Sep., 1997.

Anonymous: "Change–Notification Service for Shared Files" IBM Technical Disclosure Bulletin, vol. 36, No. 8, Aug., 1993, pp. 77–82, XP002108713 New York, US.

Anonymous: "Resource Preemption for Priority Scheduling," IBM Technical Disclosure Bulletin, vol. 16, No. 6, Nov., 1973, p. 1931 XP002109435 New York, US.

Beech et al., "Object Databases as Generalizations of Relational Databases," Computer Standards & Interfaces, vol. 13, Nos. 1/3, pp. 221–230,(Jan., 1991 , Amsterdam, NL.

Bertino et al., "Object–Oriented Database Management Systems: Concepts and Issues," Computer, vol. 24, No. 4, pp. 33–47, Apr., 1991, Los Alamitos, CA.

Betz, Mark, "Interoperable objects: laying the foundation for distributed object computing"; Dr. Dobb's Journal, vol. 19, No. 11, p. 18(13), Oct., 1994.

Bevan, D.I., "An Efficient Reference Counting Solution To The Distributed Garbage Collection Problem", Parallel Computing, NL, Elsevier Publishers, Amsterdam, vol. 9, No. 2, Jan. 9, 1989, pp. 179–192.

Birrell et al., "Implementing Remote Procedure Calls", ACM Transactions on Computer Systems, vol. 2, No. 1, Feb., 1984, pp. 39–59.

Dave A. et al., "Proxies, Application Interface, and Distributed Systems", Proceedings International Workshop on Object Orientation in Operating Systems, Sep. 24, 1992, pp. 212–220.

Deux O. et al., "The O2 System" Communications of the Association for Computing Machinery, vol. 34, No. 10, Oct., 1991, pp. 34–48.

Drexler, K. Eric, et al., "Incentive Engineering for Computational Resource Management," The Ecology of Computation, Elsevier Science Publishers B.V., 1988, pp. 231–266.

Droms, R., "RFC 1541 Dynamic Host Configuration Protocol", HTTP://WWW.CIS.OHIO–STATE.EDU/HTBIN/RFC/RFC1541.HTML, Oct., 1993, pp. 1–33.

Emms, J., "A Definition of an Access Control Systems Language" Computer Standards and Interfaces, vol. 6, No. 4, Jan. 1, 1987, pp. 443–454.

Gosling et al., "The Java (TM) Language Specification", Addison–Wesley, 1996.

Gottlob et al., "Extending Object–Oriented Systems with Roles," ACM Transactions on information systems, vol. 14, No. 3, Jul., 1996, pp. 268–296.

Guth, Rob: "JavaOne: Sun to Expand Java Distributed Computing Effort", "HTTP://WWW.SUNWORLD.COM/SWOL–02–1998/SWOL–02–SUNSPOTS.HTML," XP–002109935, 1998, p. 1.

Hamilton et al., "Subcontract: a flexible base for distributed programming"; Proceedings of 14th Symposium of Operating System Principles, Dec., 1993.

Hartman, J., Manber, U., et al., Liquid Software: A new paradigm for networked systems, Technical Report 96–11, Department of Comp. Sci., Univ. of Arizona, Jun., 1996.

Hunt, N., "IDF: A Graphical Data Flow Programming Language for Image Processing and Computer Vision", Proceedings of the International Conference on Systems, Man, and Cybernetics, Los Angeles, Nov. 4–7, 1990, pp. 351–360.

IBM (TM) Technical Disclosure Bulletin, "Object Location Algorithm," vol. 36, No. 09B, Sep. 1993, pp. 257–258.

IBM (TM) Technical Disclosure Bulletin, "Retrieval of Qualified Variables Using Extendible Hashing," vol. 36, No. 12, Dec., 1993, pp. 301–303.

IBM: "Chapter 6—Distributed SOM (DSOM)" Somobjects Developer Toolkit Users Guide, Version 2.1, Oct., 1994 (1994–10), pp. 6–1–6–90.

IBM (TM) Technical Disclosure Bulletin, "Fast and Secure Stored Procedures for a Client/Server DBMS", vol. 38, No. 01, Jan., 1995, pp. 79–82.

Jones, Richard, et al., "Garbage Collection: Algorithms for Automatic Dynamic Memory Management," John Wiley & Sons, 1996, pp. 165–175.

Kay, Michael H. et al., "An Overview of the Raleigh Object–Oriented Database System", ICL Technical Journal, vol. 7, No. 4, Nov., 1991, pp. 780–798, Oxford, GB.

Kougiouris et al., "Support for Space Efficient Object Invocation in Spring", Sep., 1994.

Lindholm et al., "The Java (TM) Virtual Machine Specification", Addison Wesley, 1996.

Mitchell et al., "An Overview of the Spring System", Feb., 1994.

Orfali R. et al., "The Essential Distributed Objects Survival Guide," Chapter 11: Corba Commercial ORBs, John Wiley & Sons, Inc., 1996, pp. 203–215.

Riggs Roger et al., "Pickling State in the Java (TM) System," USENIX Association Conference on Object–Oriented Technologies and Systems, XP–002112719, Jun. 17–21, 1996, pp. 241–250.

Rosenberry et al., "Understanding DCE"; Chapters 1–3, 6; 1992.

Waldo J et al: "Events in an RPC based distributed system" Proceedings of the 1995 USENIX Technical Conference, Proceedings USENIX Winter 1995 Technical Conference, New Orleans, LA. USA, Jan. 16–20, 1995, pp. 131–142.

Wilson, P.R., et al., "Design of the Opportunistic Garbage Collector," Proceedings of the Object Oriented Programming Systems Languages And Applications Conference, New Orleans, vol. 24, No. 10, Oct. 1–6, 1989, pp. 23–35.

Wu, Xuequn, "A Type system for an Object–Oriented Database System," Proccedings of the International Computer Software and Applications Conference (COMPSAC), Sep. 11–13, 1991, Tokyo, Japan, pp. 333–338.

Yemini, Y. and S. da silva, "Towards Programmable Networks", IFIP/IEEE International Workshop on Distributed Systems: Operations and Management, L'Aquila, Italy, Oct., 1996, pp. 1–11.

Yin J. et al., "Using Leases to Support Server Driven Consistency in Large–Scale Systems", Computer Services Department, University of Texas at Austin, Feb., 1998, pp. 285–294.

Mullender, *Distributed Systems*, Second Edition, Addison-Wesley, 1993.

Howard et al., Scale and Performance in a Distributed File System, ACM Transactions on Computer Systems, vol. 6, No. 1, Feb. 1988, pp. 51–81.

Cardelli, *Obliq, A lightweight language for network objects*, Nov. 5, 1993, pp. 1–37.

Dijkstra, Self–stabilizing Systems in Spite of Distributed Control, Communications of the ACM, vol. 17, No.11, Nov. 1974, pp. 643–644.

Ousterhout et al., The Sprite Network Operating System, Computer, IEEE, Feb. 1988, pp. 23–36.

Dourish, A Divergence–Based Model of Synchrony and Distribution in Collaborative Systems, Xerox Technical Report EPC–1194–102, 1994, pp. 1–10.

Sharrott et al., ObjectMap: Integrating High Performance Resources into a Distributed Object–oriented Environment, ICODP, 1995.

Birrell et al., Grapevine: An Exercise in Distributed Computing, Communications of the ACM, vol. 25, No. 4, Apr. 1982, pp. 260–274.

*Transparent Network Computing*, Locus Computing Corporation, Jan. 5, 1995.

Gray et al., Leases: An Efficient Fault–Tolerant Mechanism for Distributed File Cache Consistency, ACM, 1989, pp. 202–210.

Lamport et al., The Byzantine Generals Problem, ACM Transactions on Programming Languages and Systems, vol.4, No. 3, Jul. 1982, pp. 382–401.

Dolev et al., On the Minimal Synchronism Needed for Distributed Consensus, Journal of the ACM, vol. 34, No. 1, Jan. 1987, pp. 77–97.

Mummert et al., Long Term Distributed File Reference Tracing: Implementation and Experience, Carnegie Mellon University School of Computer Science, Nov. 1994, pp. 1–28.

Gelernter et al., *Parallel Programming in Linda,* Yale University, Jan. 1985, pp. 1–21.

Cannon et al., Adding Fault–Tolerant Transaction Processing to LINDA, Software–Practice and Experience, vol. 24(5), May 1994, pp. 449–466.

Kambhatla et al., Recovery with Limited Replay: Fault–Tolerant Processes in Linda, Oregon Graduate Institute, Technical Report CSIE 90–019, Sep. 1990, pp. 1–16.

Anderson et al., Persistent Linda: Linda + Transactions + Query Processing, Proceedings of the 13th Symposium on Fault Tolerant Systems, 1994, pp. 93–109.

Gelernter, Generative Communication in Linda, ACM Transactions on Programming Languages and Systems, vol. 7, No. 1, Jan. 1985, pp. 80–112.

Carriero et al., Distributed Data Structures in Linda, Principals of Programming Language, 1986, pp. 1–16.

Pinakis, Using Linda as the Basis of an Operating System Microkernel, University of Western Australia, Department of Computer Science, Aug. 1993, pp. 1–165.

LINDA Database Search, Jul. 20, 1995, pp. 1–68.

Carriero et al, Distributed Data Structures in Linda, Yale Research Report YALEU/DCS/RR–438, Nov. 1985.

Agha et al., Actorspaces: An Open Distributed Programming Paradigm, University of Illinois, Report No. UIUCDCS–R–92–1766, Open Systems Laboratory TR No. 8, Nov. 1992, pp. 1–12.

Ahmed et al., A Program Building Tool for Parallel Applications, Yale University, Dec. 1, 1993, pp. 1–23.

Liskov et al., Distributed Object Management in Thor, International Workshop on Distributed Object Management, 1992, pp. 12.

Coulouris et al., *Distributed Systems Concepts and Designs,* Second Edition, Addison–Wesley, 1994.

Birrell et al., Network Objects, DEC SRC Research Report 115, Feb. 28, 1994.

Birrell et al., Distributed Garbage Collection for Network Objects, DEC SRC Research Report 116, Dec. 15, 1993.

Jaworski, *Java 1.1 Developer's Guide,* Sams.net, 1997.

Wollrath et al., A Distributed Object Model for the Java™ System, USENIX Association, Conference on Object–Oriented Technologies and Systems, Jun. 17–21, 1996.

Harris et al., Proposal for a General Java Proxy Class for Distributed Systems and Other Uses, Netscape Communications Corp., Jun. 25, 1997.

Hamilton, Java and the Shift to Net–Centric Computing Computer, Aug. 1996, pp. 31–39.

Chung et al., *A 'Tiny' Pascal Compiler: Part 1: The P–Code Interpreter*, BYTE Publications, Inc., Sep. 1978.

Chung et al., *A 'Tiny' Pascal Compiler: Part 2: The P–Compiler*, BYTE Publications, Inc., Oct. 1978.

Thompson, Regular Expression Search Algorithm, Communications of the ACM, vol. II, No. 6, p. 149 et seq., Jun. 1968.

Mitchell et al., *Mesa Language Manual*, Xerox Corporation, 1978.

McDaniel, *An Analysis of a Mesa Instruction Set*, Xerox Corporation, May 1982.

Pier, A Retrospective on the Dorado, A High–Performance Personal Computer, Xerox Corporation, Aug. 1983.

Pier, A Retrospective on the Dorado, A High–Performance Personal Computer, IEEE Conference Proceedings, The 10th Annual international Symposium on Computer Architecture, 1983.

Krasner, *The Smalltalk–80 Virtual Machine*, BYTE Publications Inc., Aug. 1991, pp. 300–320.

Birrell, *Operating Systems Review*, ACM Press, vol. 27, No. 5, Dec. 1993, pp. 217–230.

Remote Method Invocation Specfication, Sun Microsystems, Inc., (1997), http://java.sun.com/products/jdk/1.1/docs/guide/rmi/spec/rmiTOC.doc.html.

"Eden Project Proposal," Department of Computer Science, University of Washington, Oct. 1980, Technical Report #80–10–01, cover and Foreword.

Almes et al., "Edmas: A Locally Disributed Mail System," Department of Computer Science, University of Washington, Technical Report 83–07–21, Jul. 7, 1983, Abstract & pp. 1–17.

Almes et al., "Research in Integrated Distributed Computing," Department of Computer Science, University of Washington, Oct. 1979, pp. 1–42.

Almes et al., "The Eden System: A Technical Review, "Department of Computer Science, University of Washington, Technical Report 83–10–05, Oct. 1983, pp. 1–25.

Almes, "Integration and Distribution in the Eden System," Department of Computer Science, University of Washington, Technical Report, 83–01–02, Jan. 19, 1983, pp. 1–18 & Abstract.

Almes, "The Evolution of the Eden Invocation Mechanism," Department of Computer Science, University of Washington, Technical Report 83–01–03, Jan. 19, 1983, pp. 1–14 & Abstract.

Arnold, Ken, "The Jini Architecture: Dynamic Services in a Flexible Network," Sun Microsystems, Inc., Proceedings of the 36th ACM IEEE Design Automation Conference, Jun. 1999, pp. 157–162.

Begole et al., "Transparent Sharing of Java Applets: A Replicated Approach," Oct. 1997, pp. 55–65.

Black et al., "A Language for Distributed Programming," Department of Computer Science, University of Washington, Technical Report 86–02–03, Feb. 1986, p. 10.

Black et al., "Distribution and Abstract Types in Emerald," University of Washington, Technical Report No. 85–08–05, Aug. 1985, pp. 1–10.

Black et al., "Object Structure in the Emerald System," University of Washington , Technical Report 86–04–03, Apr. 1986, pp. 1–14.

Black et al., "The Eden Project: A Final Report," Department of Computer Science, University of Washington, Technical Report 86–11–01, Nov. 1986, pp. 1–28.

Black, "Supporting Distributed Applications: Experience with Eden," Department of Computer Science, University of Washington, Technical Report 85–03–02, Mar. 1985, pp. 1–21.

Black, "The Eden Programming Language," Department of Computer Science, FR–35, University of Washington, Technical Report 85–09–01, Sep. 1985 (Revised Dec. 1985), pp. 1–19.

Black, "The Eden Project: Overview and Experiences," Department of Computer Science, University of Washington, EUUG, Autumn '86 Conference Proceedings, Manchester, UK, Sep. 22–25, 1986, pp. 177–189.

Braine et al., "Object–Flow," 1997, pp. 418–419.

Burns et al., "An Analytical Study of Opportunistic Lease Renewal," Distributed Computing Systems, 21st International Conference, pp. 146–153, Apr. 2000.

Ciancarini et al., "Coordinating Distributed Applets with Shade/Java," Feb. 1998, pp. 130–138.

Delcambre et al., "Simulation of the Object Flow Model: A Conceptual Modeling Language for Object–Driven Applications," 1993, pp. 216–225.

Goldberg et al., "Smalltalk–80 –The Language and its Implementation," Xerox Palo Alto Research Center, 1983 (reprinted with corrections, Jul. 1985), pp. 1–720.

Hodges, Douglas, "Managing Object Lifetimes in OLE," Aug. 25, 1994, pp. 1–41.

Holman et al., "The Eden Shared Calendar System," Department of Computer Science, FR–35, University of Washington, Technical Report 85–05–02, Jun. 22, 1985, pp. 1–14.

Hoshi et al., "Allocation of the Cross–Connect Function in Leased Circuit Networks,"1992, ICC'92, conference record, SUPERCOMM/ICC '92, A New World of Communications, IEEE International Conference, pp. 1408–1412.

Hsu, "Reimplementing Remote Procedure Calls," University of Washington, Thesis, Mar. 22, 1985, pp. 1–106.

Hutchinson, "Emerald: An Object–Based Language for Distributed Programming,"a Dissertation, University of Washington, 1987, pp. 1–107.

Jacob, "The Use of Distributed Objects and Dynamic Interfaces in a Wide–Area Transaction Environment,"SIG-COMMn '95 Workshop on Middleware: Cambridge, Mass., Aug. 1995, pp. 1–3.

Jul et al., "Fine–Grained Mobility in the Emerald System," University of Washington, ACM Transactions on Computer Systems, vol. 6, No. 1, Feb. 1988, pp. 109–133.

Jul, "Object Mobility in a Distributed Object–Oriented System," a Dissertation, University of Washington, 1989, pp. 1–154 (1 page Vita).

Koshizuka et al., "WIndow Real–Objects: A Distributed Shared Memory for Distributed Implementation of GUI Applications,", Nov. 1993, pp. 237–247.

Krasner et al., "Smalltalk–80: Bits of History, Words of Advice," 1983, Xerox Corporation, pp. 1–344.

Lavana et al., "Executable Workflows: A Paradigm for Collaborative Design on the Internet," Jun. 1997, 6 pages.

Proceedings of the Eighth Symposium on Operating Systems Priniciples, Dec. 14–16, 1981, ACM, Special Interest Group on Operating Systems, Association for Computing Machinery, vol. 15, No. 5, Dec. 1981, ACM Order No. 534810.

Proudfoot, "Replects: Data Replication in the Eden System," Department of Computer Science, University of Washington, Technical Report No. TR–85–12–04, Dec. 1985, pp. 1–156.

Pu, "Replication and Nested Transaction in the Eden Distributed System," Doctoral Dissertation, University of Washington, Aug. 6, 1986, pp. 1–179 (1 page Vita).

Trehan et al., "Toolkit for Shared Hypermedia on a Distributed Object Oriented Architecture,"1993, pp. 1–8.

McGrath, "Discovery and Its Discontents: Discovery Protocols for Ubiquitous Computing," Presented at Center for Excellence in Space Data and Information Science, NASA Goddard Space Flight Center, Apr. 5, 2000.

Yin et al., "Volume Leases for Consistency in Large–Scale Systems,"IEEE Transactions on Knowledge & Data Engineering, vol. 11, No. 4, pp. 563–576, Jul./Aug. 1999.

* cited by examiner

METHODS AND APPARATUS FOR REMOTE METHOD INVOCATION

REFERENCE TO RELATED APPLICATIONS

The following identified U.S. patent applications are relied upon and are incorporated by reference in this application as if fully set forth.

Provisional U.S. Patent Application No. 60/076,048, entitled "Distributed Computing System," filed on Feb. 26, 1998.

U.S. patent application Ser. No. 09/044,923, entitled "Method and System for Leasing Storage,", and filed on Mar. 20, 1998, now U.S. Pat. No. 6,263,350.

U.S. patent application Ser. No. 09/044,838, entitled "Method, Apparatus, and Product for Leasing of Delegation Certificates in a Distributed System," filed on Mar. 20, 1998, now U.S. Pat. No. 6,247,026.

U.S. patent application Ser. No. 09/044,834, entitled "Method, Apparatus and Product for Leasing of Group Membership in a Distributed System," and filed on Mar. 20, 1998, now U.S. Pat. No. 6,421,704.

U.S. patent application Ser. No. 09/044,916, entitled "Leasing for Failure Detection," and filed on Mar. 20, 1998, now U.S. Pat. No 6,016,500.

U.S. patent application Ser. No. 09/044,933, entitled "Method for Transporting Behavior in Event Based System," filed on Mar. 20, 1998. herewith.

U.S. patent application Ser. No. 09/044,919, entitled "Deferred Reconstruction of Objects and Remote Loading for Event Notification in a Distributed System, " filed on Mar. 20, 1998, now U.S. Pat. No. 6,272,559.

U.S. patent application Ser. No. 09/045,652, entitled "Method and System for Deterministic Hashes to Identify Remote Methods," filed on Mar. 20, 1998, now U.S. Pat. No. 6,134,603.

U.S. patent application Ser. No. 09/044,790, entitled "Method and Apparatus for Determining Status of Remote Objects in a Distributed System," filed on Mar. 20, 1998.

U.S. patent application Ser. No. 09/044,930, entitled "Downloadable Smart Proxies for Performing Processing Associated with a Remote Procedure Call in a Distributed System," filed on Mar. 20, 1998, now U.S. Pat. No. 6,393,497.

U.S. patent application Ser. No. 09/044,917, entitled "Suspension and Continuation of Remote Methods," filed on Mar. 20, 1998, now U.S. Pat. No. 6,237,024.

U.S. patent application Ser. No. 09/044,835, entitled "Method and System for Multi-Entry and Multi-Template Matching in a Database," filed on Mar. 20, 1998, now U.S. Pat. No. 6,182,083.

U.S. patent application Ser. No. 09/044,839, entitled "Method and System for In-Place Modifications in a Database," filed on Mar. 20, 1998, now abandoned.

U.S. patent application Ser. No. 09/044,945, entitled "Method and System for Typesafe Attribute Matching in a Database," filed on Mar. 20, 1998, now abandoned.

U.S. patent application Ser. No. 09/044,931, entitled "Dynamic Lookup Service in a Distributed System," filed on Mar. 20, 1998, now U.S. Pat. No. 6,185,611.

U.S. patent application Ser. No. 09/044,939, entitled "Apparatus and Method for Providing Downloadable Code for Use in Communicating with a Device in a Distributed System," filed on Mar. 20, 1998.

U.S. patent application Ser. No. 09/044,826, entitled "Method and System for Facilitating Access to a Lookup Service," filed on Mar. 20, 1998.

U.S. patent application Ser. No. 09/044,932, entitled "Apparatus and Method for Dynamically Verifying Information in a Distributed System," filed on Mar. 20, 1998.

U.S. patent application Ser. No. 09/030,840, entitled "Method and Apparatus for Dynamic Distributed Computing Over a Network," and filed on Feb. 26, 1998.

U.S. patent application Ser. No. 09/044,936, entitled "An Interactive Design Tool for Persistent Shared Memory Spaces," filed on Mar. 20, 1998.

U.S. patent application Ser. No. 09/044,934, entitled "Polymorphic Token-Based Control," filed on Mar. 20, 1998.

U.S. patent application Ser. No. 09/044,915, entitled "Stack-Based Access Control," filed on Mar. 20, 1998, now U.S. Pat. No. 6,138,238.

U.S. patent application Ser. No. 09/044,944, entitled "Stack-Based Security Requirements," filed on Mar. 20, 1998, now U.S. Pat. No. 6,226,746.

U.S. patent application Ser. No. 09/044,837, entitled "Per-Method Designation of Security Requirements," filed on Mar. 20, 1998, now U.S. Pat. No. 6,282,652.

FIELD OF THE INVENTION

The present invention relates to a system and method for transmitting objects between machines in a distributed system and more particularly relates to methods for invocation of remote methods in a distributed system.

BACKGROUND OF THE INVENTION

Distributed programs that concentrate on point-to-point data transmission can often be adequately and efficiently handled using special-purpose protocols for remote terminal access and file transfer. Such protocols are tailored to a specific program and, therefore, do not provide a foundation on which to build a variety of distributed programs (e.g., distributed operating systems, electronic mail systems, conferencing systems, etc.).

While conventional transport services can be used as the basis for building distributed programs, these services exhibit many organizational problems, such as the use of different data types in different machines, lack of facilities for synchronization, and no provision for a limited programming paradigm.

Distributed systems usually contain a number of different types of machines interconnected by communications networks. Each machine has its own internal data types, its own address alignment rules, and its own operating system. This heterogeneity causes problems when building distributed systems. As a result, program developers must include in programs developed for such heterogeneous distributed systems the capability of dealing with ensuring that information is handled and interpreted consistently on different machines.

However, one simplification is afforded by noting that a large proportion of programs use a request and response interaction between processes where the initiator (i.e., program initiating a communication) is blocked waiting until the response is returned and is thus idle during this time. This can be modeled by a procedure call mechanism between processes. One such mechanism is referred to as the remote procedure call (RPC).

RPC is a mechanism for providing synchronized communication between two processes (e.g., program, applet, etc.) running on the same machine or different machines. In a simple case, one process, e.g., a client program, sends a message to another process, e.g., a server program. In this case, it is not necessary for the processes to be synchronized either when the message is sent or received. It is possible for the client program to transmit the message and then begin a new activity, or for the server program's environment to buffer the incoming message until the server program is ready to process a new message.

RPC, however, imposes constraints on synchronism because it closely models a local procedure call within the calling process, which requires passing parameters in one direction, blocking the calling process until a called procedure of the server program is complete, and then returning a response. RPC thus involves two message transfers, and the synchronization of the two processes for the duration of the call.

The RPC mechanism is usually implemented in two processing parts using the local procedure call paradigm, one part being on the client side and the other part being on the server side. Both of these parts will be described below with reference to FIG. 1.

FIG. 1 is a diagram illustrating the flow of call information using an RPC mechanism. As shown in FIG. 1, a client program 100 issues a call (step 102). The RPC mechanism 101 then packs the call as arguments of a call packet (step 103), which the RPC mechanism 101 then transmits to a server program 109 (step 104). The call packet also contains information to identify the client program 100 that first sent the call. After the call packet is transmitted (step 104), the RPC mechanism 101 enters a wait state during which it waits for a response from the server program 109.

The RPC mechanism 108 for the server program 109 (which may be the same RPC mechanism as the RPC mechanism 101 when the server program 109 is on the same platform as the client program 100) receives the call packet (step 110), unpacks the arguments of the call from the call packet (step 111), identifies, using the call information, the server program 109 to which the call was addressed, and provides the call arguments to the server program 109.

The server program receives the call (step 112), processes the call by invoking the appropriate procedure (step 115), and returns a response to the RPC mechanism 108 (step 116). The RPC mechanism 108 then packs the response in a response packet (step 114) and transmits it to the client program 100 (step 113).

Receiving the response packet (step 107) triggers the RPC mechanism 101 to exit the wait state and unpack the response from the response packet (step 106). RPC 101 then provides the response to the client program 100 in response to the call (step 105). This is the process flow of the typical RPC mechanism modeled after the local procedure call paradigm. Since the RPC mechanism uses the local procedure call paradigm, the client program 100 is blocked at the call until a response is received. Thus, the client program 100 does not continue with its own processing after sending the call; rather, it waits for a response from the server program 109.

The Java™ programming language is an object-oriented programming language that is typically compiled into a platform-independent format, using a bytecode instruction set, which can be executed on any platform supporting the Java virtual machine (JVM). This language is described, for example, in a text entitled "The Java Language Specification" by James Gosling, Bill Joy, and Guy Steele, Addison-Wesley, 1996, which is incorporated herein by reference. The JVM is described, for example, in a text entitled "The Java Virtual Machine Specification," by Tim Lindholm and Frank Yellin, Addison Wesley, 1996, which is incorporated herein by reference. Java and Java-based trademarks are trademarks or registered trademarks of Sun Microsystems, Inc. in the United States and other countries.

In object-oriented systems, a "class" provides a template for the creation of "objects" (which represent items or instances manipulated by the system) having characteristics of that class. The term template denotes that the objects (i.e., data items) in each class share certain characteristics or attributes determined by the class. A class thus defines the type of an object. Objects are typically created dynamically during system operation. Methods associated with a class are generally invoked (i.e., caused to operate) on the objects of the same class or subclass.

Because the JVM may be implemented on any type of platform, implementing distributed programs using the JVM significantly reduces the difficulties associated with developing programs for heterogenous distributed systems. Moreover, the JVM uses a remote method invocation (RMI) system that enables communication among programs of the system. RMI is explained in, for example, the following document, which is incorporated herein by reference: Remote Method Invocation Specification, Sun Microsystems, Inc. (1997), which is available via universal resource locator (URL) www.javasoft.com/products/jdk/1.1/docs/guide/rmi/spec/rmiTOC.doc.html.

FIG. 2 is a diagram illustrating the flow of objects in an object-oriented distributed system 200 including machines 201 and 202 for transmitting and receiving method invocations using the JVM. In system 200, machine 201 uses RMI 205 for responding to a call from object 203 to invoke a method on remote object 204 by converting the call, including an identification of the method and any parameters into a byte stream 207. While machine 201 is responding to the call from object 203, a process running on the same or another machine in system 200 may continue operation without waiting for a response.

Machine 202 receives the byte stream 207. Using RMI 206, machine 202 automatically converts it into executable bytecode to initiate the invocation of the method on object 204. RMI can also be used to transport objects within the distributed system for use in connection with processes executing on remote machines.

In order to perform RMI, these machines use code referred to as stubs and skeletons created by an RMI compiler. A stub resides on a client machine and includes a reference to a remote object and acts as a proxy for the remote object. The skeleton is also a proxy for the remote object but it resides on the server machine containing the remote object. Thus, the stub resides on a client machine making a call for invocation of a method of a remote object, and the skeleton resides on a server machine containing the remote object. In addition, remote objects are referenced via interfaces, which are collections of related constants and methods. The stub and skeleton typically must be type-specific based on the type of remote object involved in the call. Therefore, varying types of stubs and skeletons must exist for RMI involving varying types of objects. Stubs and skeletons are explained in for example, the following document, which is incorporated herein by reference: Jamie Jaworski, "Java 1.1 Developer's Guide, Second Edition," pp. 371–383, Sams.net Publishing (1997). They are also explained in the Remote Method Invocation Specification identified above.

Accordingly, a need exists for generic code for use in RMI involving varying types of objects.

SUMMARY OF THE INVENTION

A first method consistent with the present invention includes receiving a request to invoke a method of an object and determining the method to be invoked using a generic code. The method is invoked based on the determination, and an indication of the invoked method is provided.

A second method consistent with the present invention includes receiving a request to invoke a method of an object of a specific class and determining the method using a common process for all of the classes. The method is invoked based on the determination, and an indication of the invoked method is provided.

A third method consistent with the present invention includes receiving a request to invoke a first method of a first object and a second method of a second object being of a different type from the first object, and determining the first and second methods to be invoked using a common process. The first and second methods are invoked based on the determination, and an indication of the first invoked method and the second invoked method is provided.

A first apparatus consistent with the present invention receives a request to invoke a method of an object and determines the method to be invoked using a generic code. The apparatus invokes the method based on the determination and provides an indication of the invoked method.

A second apparatus consistent with the present invention receives a request to invoke a method of an object of a specific class and determines the method using a common process for all of the classes. The apparatus invokes the method based on the determination and provides an indication of the invoked method.

A third apparatus consistent with the present invention receives a request to invoke a first method of a first object and a second method of a second object being of a different type from the first object, and it determines the first and second methods to be invoked using a common process. The apparatus invokes the first and second methods based on the determination and provides an indication of the first invoked method and the second invoked method.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

Overview

A system consistent with the present invention performs remote method invocation using a generic proxy class. Generally, a client machine transmits a call for invocation of a method of a remote object including an identifier for the method object, and a server machine receives the identifier and uses generic code, not specific to any particular class, to obtain an indication of the method to be invoked, which includes any relevant parameter types. A method object is, for example, an object having code for invoking a method.

When a client receives a stub for a remote object, it is an instance of a generic proxy class that knows all the remote interfaces that the remote object implements. When the client involes a method on the stub (the generic proxy class that is type independent), the proxy's invoke method is called with the following information: the method object indicating what method the client invoked on the object; and the list of parameters for the method. A method object contains, but is not limited to, the following information: a method name; argument types; and return type(s). Each type may be either an "Object" type or a "primitive" type.

The proxy calculates a method hash for the method and transmits a call, possibly via RMI. The call contains, but is not limited to, the following information: an identifier for the object receiving the call; the method hash; and the marshalled parameters (according to the types specified in the method object). The parameter marshalling may be done in a generic proxy's code, since it only depends on knowledge of the argument types in the method object.

The server receives the call and reads the object identifier and method identifier. The method identifier is used to determine the intended method object by using a lookup table corresponding method hashes to method objects. Given the method object, the generic server-side code can uumarshal the parameters, as it can obtain the types from the method object, and it then invokes the method on the actual remote object implementation. The result of that invocation is marshalled to the client using generic code and using knowledge of the return type obtained from the method object.

The generic proxy on the client side reads the return value using the method object return type information and returns the result to the caller.

Distributed Processing System

Figure 1:
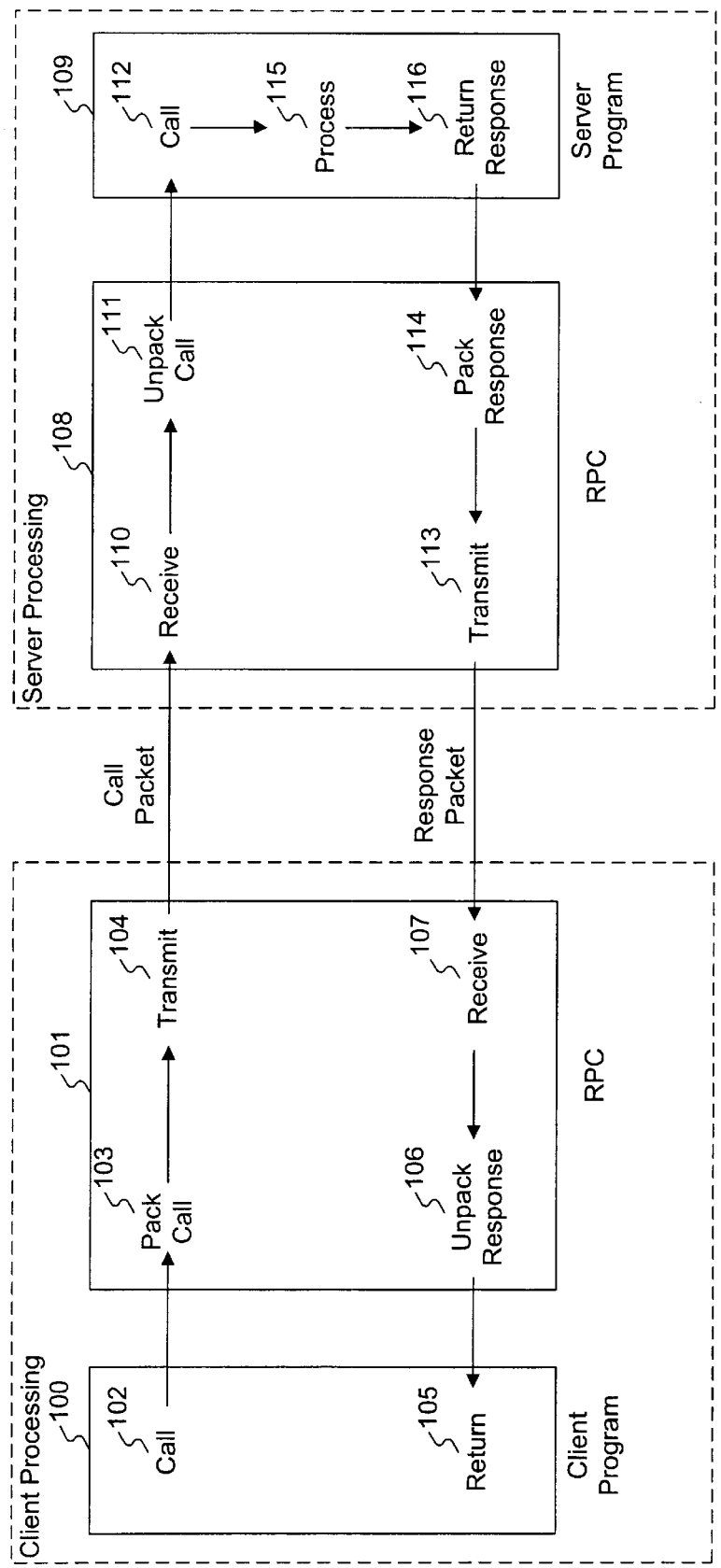
FIG. 1 is a diagram illustrating the flow of call information using an RPC mechanism.
Figure 2:
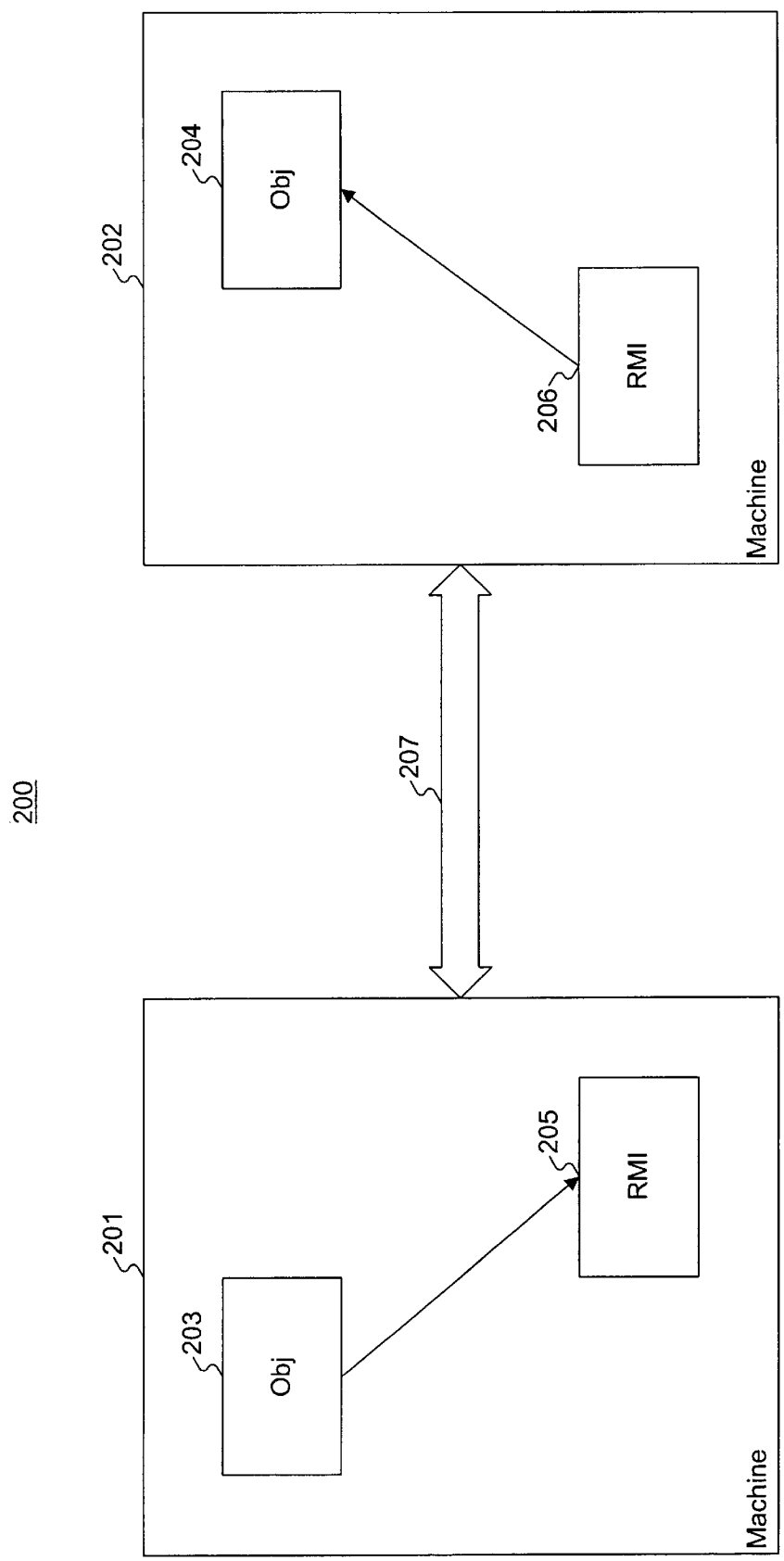
FIG. 2 is a diagram illustrating the transmission of objects in an object-oriented distributed system.
Figure 3:
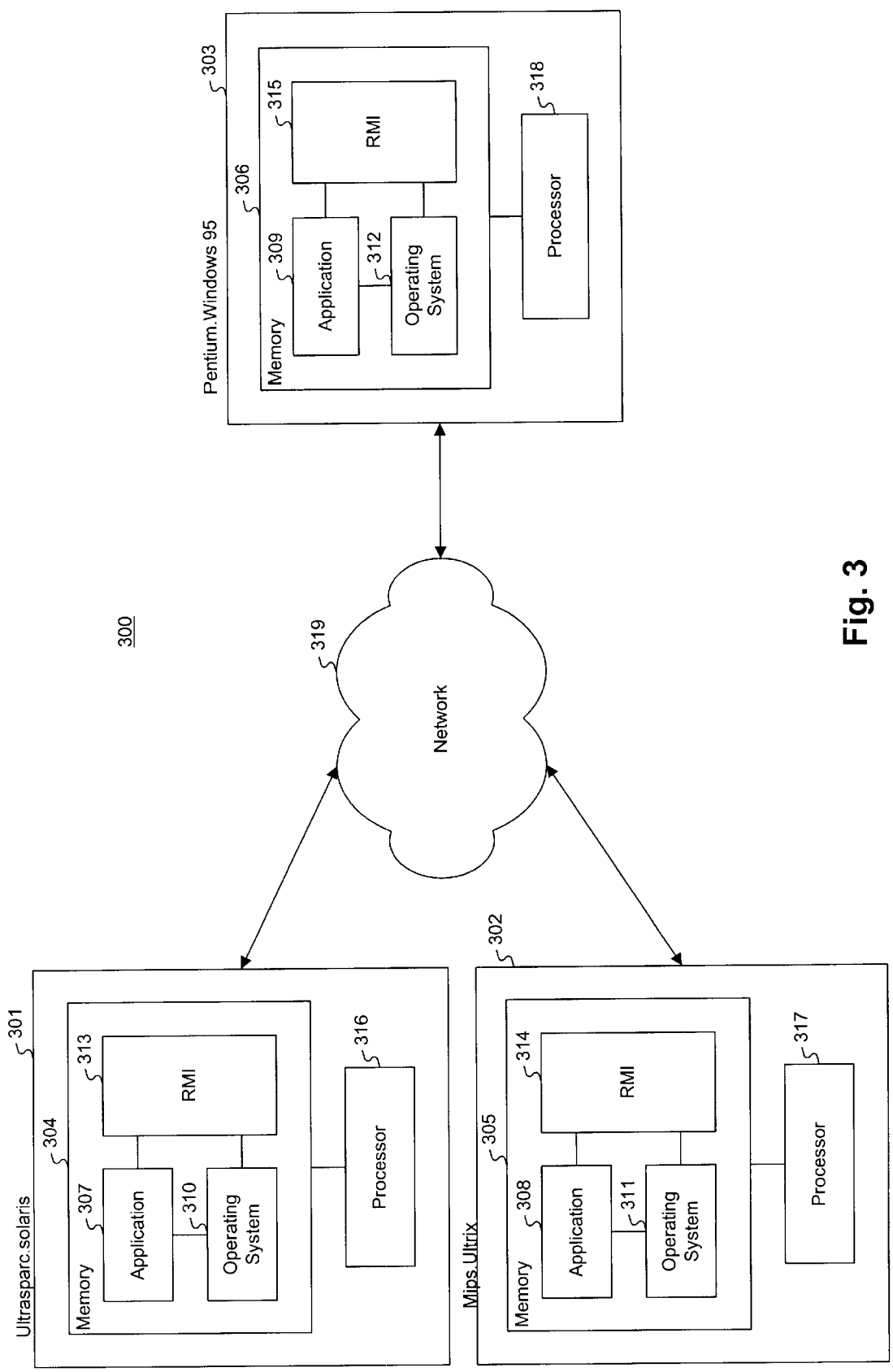
FIG. 3 is a diagram of an exemplary distributed processing system that can be used in an implementation consistent with the present invention.

FIG. 3 illustrates a distributed processing system 300 which can be used in an implementation consistent with the present invention. In FIG. 3, distributed processing system 300 contains three independent and heterogeneous platforms 301, 302, and 303 connected in a network configuration represented by network cloud 319. The composition and protocol of the network configuration represented by cloud 319 is not important as long as it allows for communication of the information between platforms 301, 302 and 303. In addition, the use of just three platforms is merely for illustration and does not limit an implementation consistent with the present invention to the use of a particular number of platforms. Further, the specific network architecture is not crucial to embodiments consistent with this invention. For example, another network architecture that could be used in an implementation consistent with this invention would employ one platform as a network controller to which all the other platforms would be connected.

In the implementation of distributed processing system 300, platforms 301, 302 and 303 each include a processor 316, 317, and 318 respectively, and a memory, 304, 305, and 306, respectively. Included within each memory 304, 305, and 306, are applications 307, 308, and 309, respectively, operating systems 310, 311, and 312, respectively, and RMI components 313, 314, and 315, respectively.

Applications 307, 308, and 309 can be applications or programs that are either previously written and modified to work with, or that are specially written to take advantage of, the services offered by an implementation consistent with the present invention. Applications 307, 308, and 309 invoke operations to be performed in accordance with an implementation consistent with this invention.

Operating systems 310, 311, and 312 are typically operating systems tied to the corresponding processors 316, 317, and 318, respectively. The platforms 301, 302, and 303 can be heterogenous. For example, platform 301 has an UltraSparc® microprocessor manufactured by Sun Microsystems, Inc. as processor 316 and uses a Solaris® operating system 310. Platform 302 has a MIPS microprocessor manufactured by Silicon Graphics Corp. as processor 317 and uses a Unix operating system 311. Finally, platform 303 has a Pentium microprocessor manufactured by Intel Corp. as processor 318 and uses a Microsoft Windows 95 operating system 312. An implementation consistent with the present invention is not so limited and could accommodate homogenous platforms as well.

Sun, Sun Microsystems, and Solaris, are trademarks or registered trademarks of Sun Microsystems, Inc. in the United States and other countries. UltraSparc and all other SPARC trademarks are used under license and are trademarks of SPARC International, Inc. in the United States and other countries. Products bearing SPARC trademarks are based upon an architecture developed by Sun Microsystems, Inc.

Memories 304, 305, and 306 serve several functions, such as general storage for the associated platform. Another function is to store applications 307, 308, and 309, RMI components 313, 314, and 315, and operating systems 310, 311, and 312 during execution by the respective processor 316, 317, and 318. In addition, portions of memories 304, 305, and 306 may constitute shared memory available to all of the platforms 301, 302, and 303 in network 319. Note that RMI components 313, 314, and 315 operate in conjunction with a JVM, which is not shown for the purpose of simplifying the figure.

Distributed System Infrastructure

Systems and methods consistent with the present invention may also operate within an exemplary particular distributed system 400, which will be described with reference to FIGS. 4 and 5. This distributed system 400 is comprised of various components, including hardware and software, to (1) allow users of the system to share services and resources over a network of many devices; (2) provide programmers with tools and programming patterns that allow development of robust, secured distributed systems; and (3) simplify the task of administering the distributed system. To accomplish these goals, distributed system 400 utilizes the Java programming environment to allow both code and data to be moved from device to device in a seamless manner. Accordingly, distributed system 400 is layered on top of the Java programming environment and exploits the characteristics of this environment, including the security offered by it and the strong typing provided by it.

Figure 4:
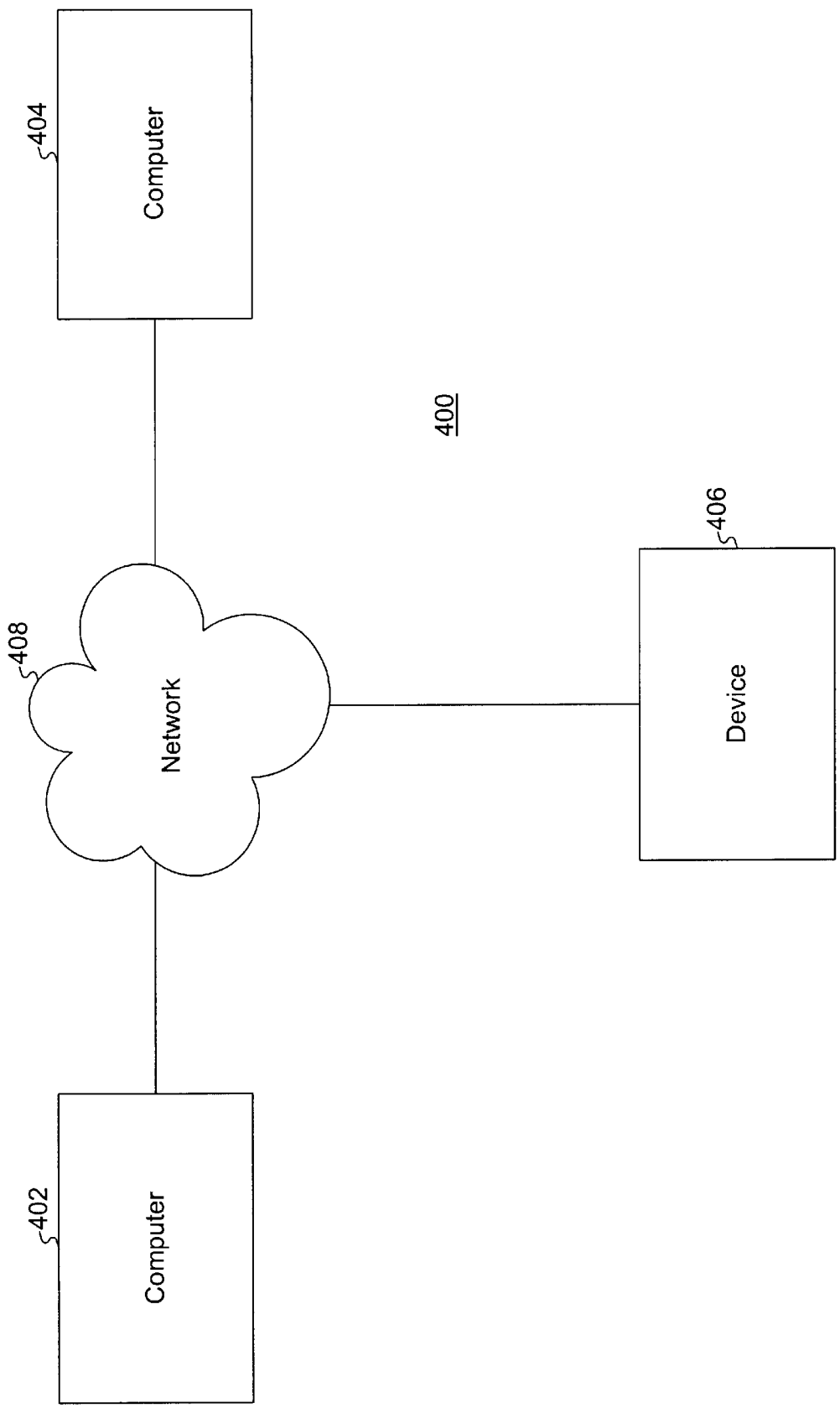
FIG. 4 is a diagram of an exemplary distributed system infrastructure.
Figure 5:
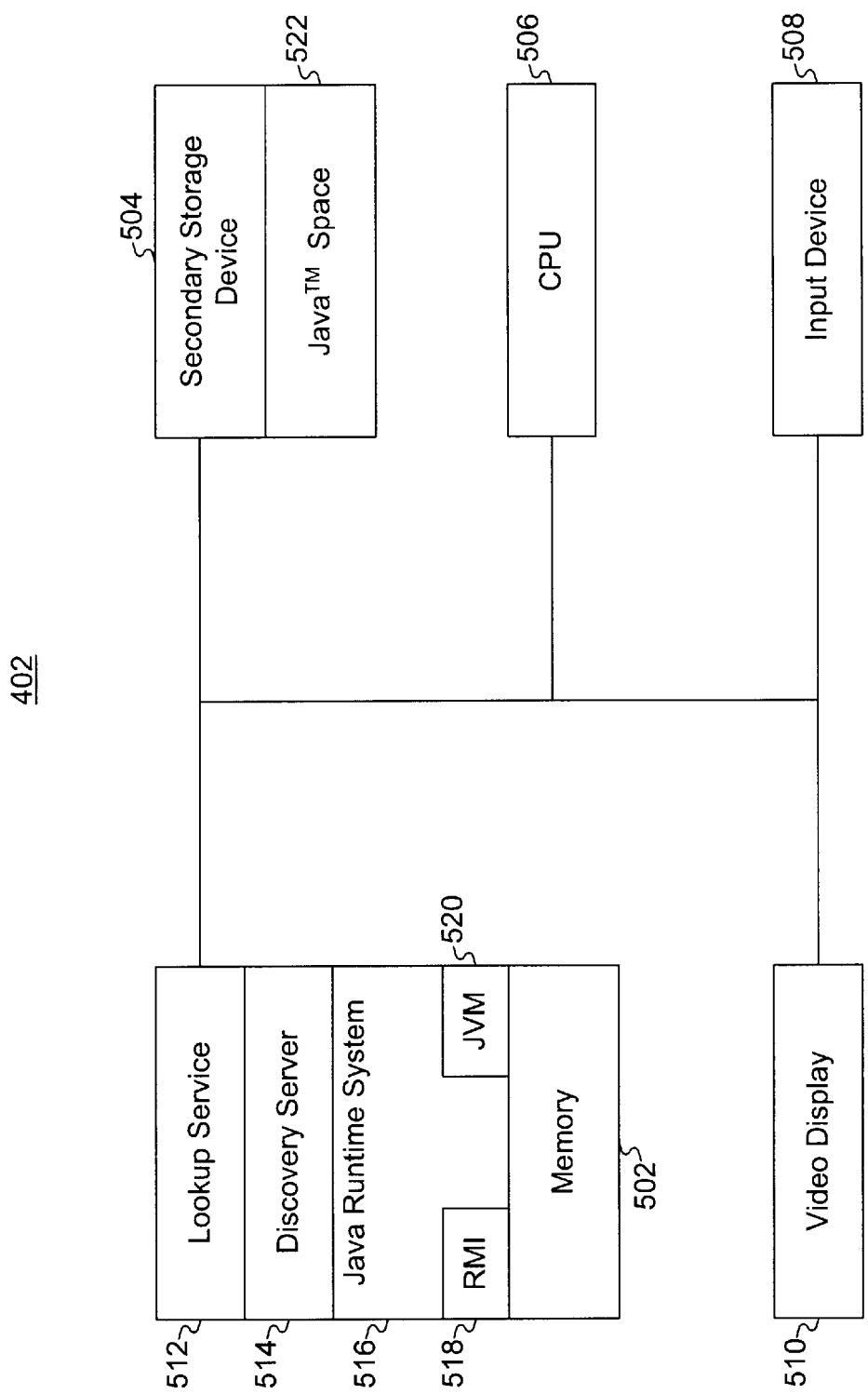
FIG. 5 is a diagram of a computer in the distributed system infrastructure shown in FIG. 4.

In distributed system 400 of FIGS. 4 and 5, different computers and devices are federated into what appears to the user to be a single system. By appearing as a single system, distributed system 400 provides the simplicity of access and the power of sharing that can be provided by a single system without giving up the flexibility and personalized response of a personal computer or workstation. Distributed system 400 may contain thousands of devices operated by users who are geographically disperse, but who agree on basic notions of trust, administration, and policy.

Within an exemplary distributed system are various logical groupings of services provided by one or more devices, and each such logical grouping is known as a Djinn. A "service" refers to a resource, data, or functionality that can be accessed by a user, program, device, or another service and that can be computational, storage related, communication related, or related to providing access to another user. Examples of services provided as part of a Djinn include devices, such as printers, displays, and disks; software, such as programs or utilities; information, such as databases and files; and users of the system.

Both users and devices may join a Djinn. When joining a Djinn, the user or device adds zero or more services to the Djinn and may access, subject to security constraints, any one of the services it contains. Thus, devices and users federate into a Djinn to share access to its services. The services of the Djinn appear programmatically as objects of the Java programming environment, which may include other objects, software components written in different programming languages, or hardware devices. A service has an interface defining the operations that can be requested of that service, and the type of the service determines the interfaces that make up that service.

Distributed system 400 is comprised of computer 402, a computer 404, and a device 406 interconnected by a network 408. Device 406 may be any of a number of devices, such as a printer, fax machine, storage device, computer, or other devices. Network 408 may be a local area network, wide area network, or the Internet. Although only two computers and one device are depicted as comprising distributed system 400, one skilled in the art will appreciate that distributed system 400 may include additional computers or devices.

FIG. 5 depicts computer 402 in greater detail to show a number of the software components of distributed system 400. One skilled in the art will appreciate that computer 404 or device 406 may be similarly configured. Computer 402 includes a memory 502, a secondary storage device 504, a central processing unit (CPU) 506, an input device 508, and a video display 510. Memory 502 includes a lookup service 512, a discovery server 514, and a Java runtime system 516. The Java runtime system 516 includes the Java RMI system 518 and a JVM 520. Secondary storage device 504 includes a Java space 522.

As mentioned above, distributed system 400 is based on the Java programming environment and thus makes use of the Java runtime system 516. The Java runtime system 516 includes the Java API libraries, allowing programs running on top of the Java runtime system to access, in a platform-independent manner, various system functions, including windowing capabilities and networking capabilities of the host operating system. Since the Java API libraries provide a single common API across all operating systems to which the Java runtime system is ported, the programs running on top of a Java runtime system run in a platform-independent manner, regardless of the operating system or hardware configuration of the host platform. The Java runtime system 516 is provided as part of the Java software development kit available from Sun Microsystems, Inc. of Mountain View, Calif.

JVM 520 also facilitates platform independence. JVM 520 acts like an abstract computing machine, receiving instructions from programs in the form of bytecodes and interpreting these bytecodes by dynamically converting them into a form for execution, such as object code, and executing them. RMI 518 facilitates remote method invocation by allowing objects executing on one computer or device to invoke methods of an object on another computer or device. Both RMI and the JVM are also provided as part of the Java software development kit.

Lookup service 512 defines the services that are available for a particular Djinn. That is, there may be more than one Djinn and, consequently, more than one lookup service within distributed system 400. Lookup service 512 contains one object for each service within the Djinn, and each object contains various methods that facilitate access to the corresponding service. Lookup service 512 is described in U.S. patent application entitled "Method and System for Facilitating Access to a Lookup Service," which was previously incorporated herein by reference.

Discovery server 514 detects when a new device is added to distributed system 400, during a process known as boot and join (or discovery), and when such a new device is detected, the discovery server passes a reference to lookup service 512 to the new device so that the new device may register its services with the lookup service and become a member of the Djinn. After registration, the new device becomes a member of the Djinn, and as a result, it may access all the services contained in lookup service 512. The process of boot and join is described in U.S. patent application entitled "Apparatus and Method for providing Downloadable Code for Use in Communicating with a Device in a Distributed System," which was previously incorporated herein by reference.

A Java space 522 is an object repository used by programs within distributed system 400 to store objects. Programs use a Java space 522 to store objects persistently as well as to make them accessible to other devices within distributed system 400. Java spaces are described in U.S. patent application Ser. No. 08/971,529, entitled "Database System Employing Polymorphic Entry and Entry Matching," assigned to a common assignee, and filed on Nov. 17, 1997, which is incorporated herein by reference. One skilled in the art will appreciate that an exemplary distributed system 400 may contain many lookup services, discovery servers, and Java spaces.

Data Flow in a Distributed Processing System

Figure 6:
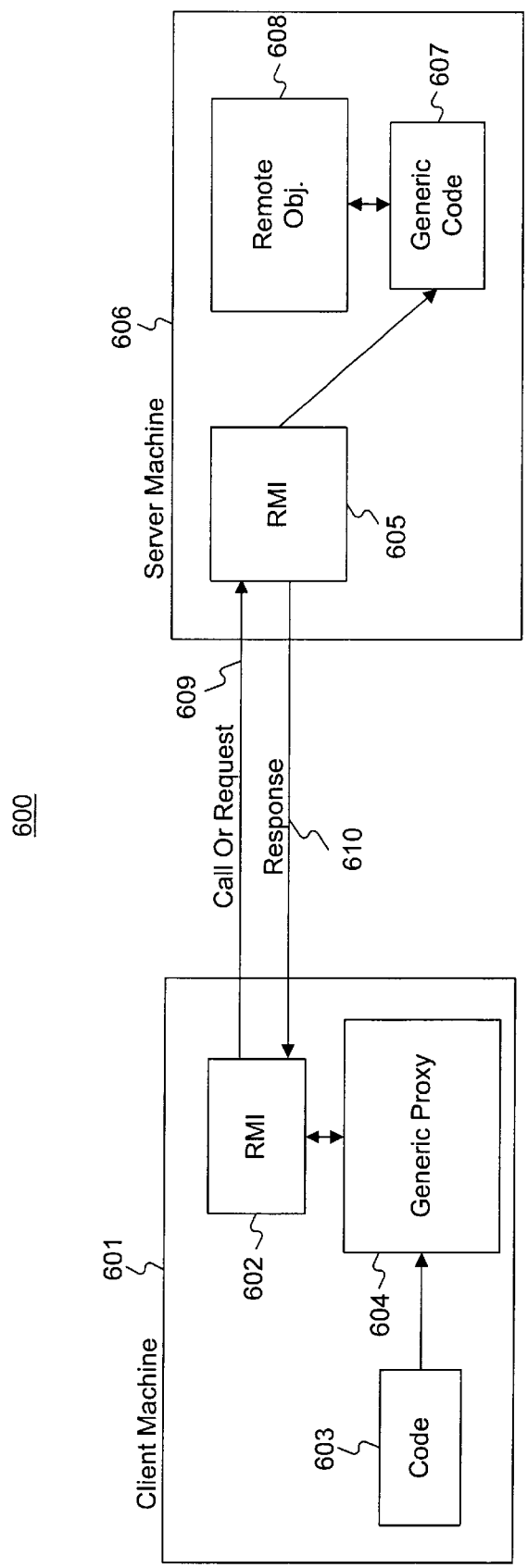
FIG. 6 is a block diagram of a system using generic code for RMI.

FIG. 6 is a block diagram of an object-oriented distributed network 600 connecting machines 601 and 606, such as computers or virtual machines executing on one or more computers, or the machines described with reference to FIGS. 3, 4, and 5. Network 600 includes a client machine 601 containing RMI 602 and associated code 603. A server machine 606 includes RMI 605 and remote object 608. In operation, RMI 602 transmits a call or request 609 to RMI 605, requesting invocation of a method of remote object 608. RMI 602 uses a generic proxy 604 for transmitting call 609. Generic proxy 604 provides an advantage of not being type-specific so that it may invoke methods of varying types of remote objects. Table 1 contains a class definition written in the Java programming language for a generic proxy class by Netscape Communications Corp. and extended to allow the generic proxy to support invocation to methods among a set of interfaces.

Table 1
package java.lang.reflect;
public class Proxy {
   protected native Proxy(Class [ ]implementsInterface);
   protected abstract Object invoke(Method method, Object [ ]args);
}

In place of a type-specific stub for a remote object, a generic proxy, initialized with the set of interfaces which indicates all methods that may be invoked on such a proxy, is used instead. When a call is made on the proxy, the proxy's "invoke" method is passed a "method object" which includes information about the method being invoked and also passes the required arguments bundled into an array of objects.

RMI 605 returns a response 610 using generic code 607. The generic code is used to do the following: look up the method based on the method identifier; unmarshal the parameters based on their types as indicated in the method object; invoke the method on a remote object implementation; and marshal the return result(s) (based on the type) to the client. The response may include an identification of the type of object transmitted, the data constituting the state of the object, and a network-accessible location in the form of a URL for code that is associated with the object. The response may be transmitted as a stream.

Streams used in the Java programming language, including input and output streams, are known in the art and an explanation, which is incorporated herein by reference, appears in, for example, a text entitled "The Java Tutorial: Object-Oriented Programming for the Internet," pp. 325–53, by Mary Campione and Kathy Walrath, Addison-Wesley, 1996. Object streams are explained in, for example, the Object Serialization Specification, available from Sun Microsystems, Inc. URLs are known in the art and an explanation, which is incorporated herein by reference, appears in, for example, a text entitled "The Java Tutorial: Object-Oriented Programming for the Internet," pp. 494–507, by Mary Campione and Kathy Walrath, Addison-Wesley, 1996.

Figure 7:
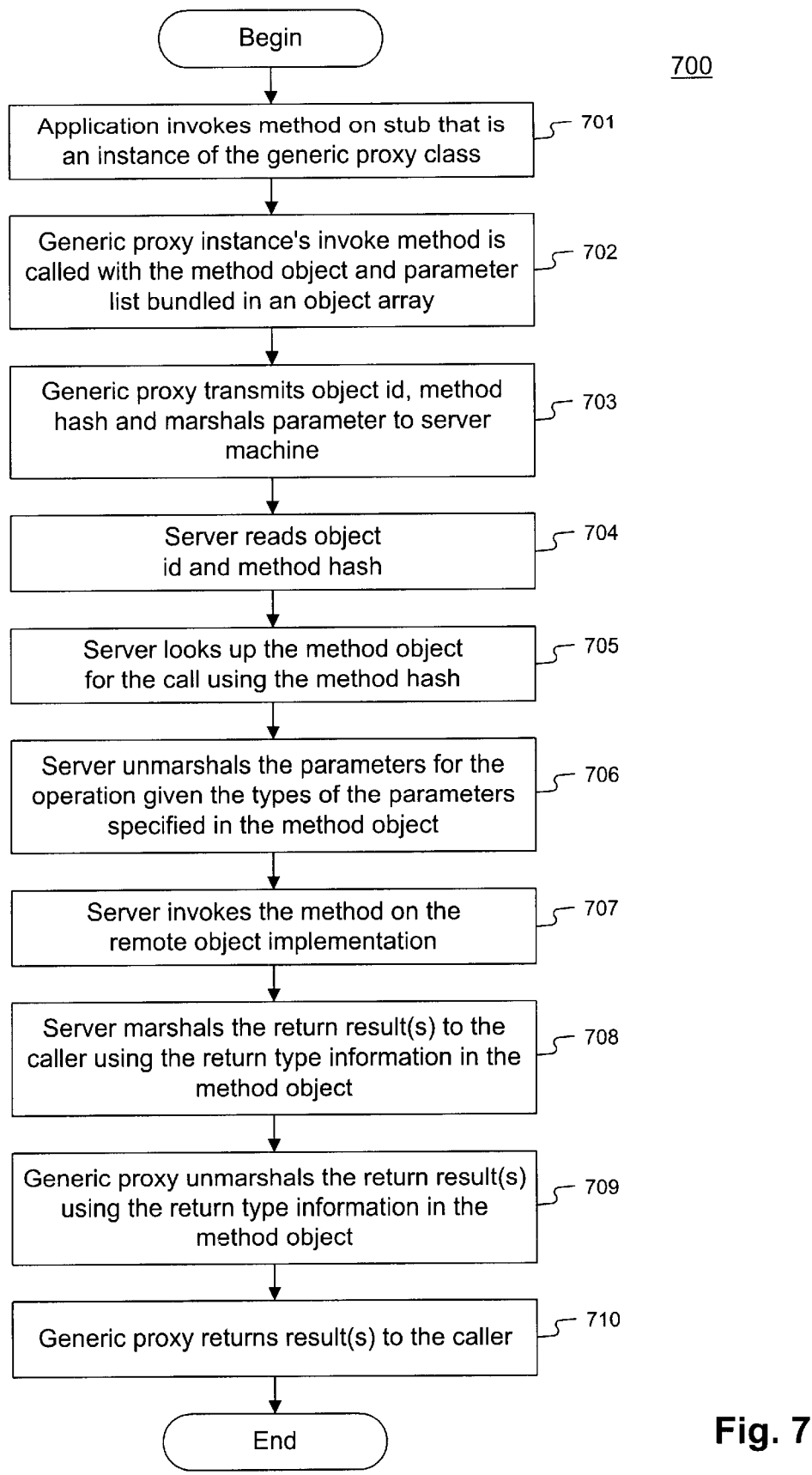
FIG. 7 is a flow chart of a process for invoking a method of a remote object using generic code.

FIG. 7 is a flow chart of a process 700 for RMI using generic code not specific to any particular type of remote objects on which the method is invoked. An application in client machine 601 invokes a method on a stub that is an instance of the generic proxy class (step 701). The generic proxy instance's "invoke" method is called with the method object and parameter list bundled in an object array (step 702). The generic proxy transmits an identifier, which may include an object id, method hash and marshals parameter to a server machine (step 703).

Further details on the use of a method hash are disclosed in U.S. patent application entitled "Method and System for Deterministic Hashes to Identify Remote Methods," which was previously incorporated herein by reference. Marshalling involves constructing an object from a byte stream including code or a reference to code for use in the construction. Marshalling and unmarshalling are explained in U.S. patent application Ser. No. 08/950,756, filed on Oct. 15, 1997, and entitled "Deferred Reconstruction of Objects and Remote Loading in a Distributed System," now allowed, which is incorporated herein by reference.

Server machine 606 reads the object id and method hash (step 704), and it looks up the method object for the call using the method hash (step 705). Server machine 606 unmarshals the parameters for the operation given the types of the parameters specified in the method object (step 706). Step 706 may involve building a method table, which compiles values for particular methods and is initialized when a remote object is created and exported. The generic code creates a correspondence between a method hash and a particular method object. Thus, by using the hashes in the method table, different skeletons typed to different types of objects is not required for method invocation to correspond method hash to method object.

Server machine 606 invokes the method on the remote object implementation (step 707), and it marshals the return result(s) to the caller using the return type information in the method object (step 708). The generic proxy umnarshals the return result(s) using the return type information in the method object (step 709) and returns result(s) to the caller, client machine 601 (step 710).

Machines implementing the steps shown in FIG. 7 may include computer processors for performing the functions, as shown in FIGS. 3, 4, 5, and 6. They may include modules or programs configured to cause the processors to perform the above functions. They may also include computer program products stored in a memory. The computer program products may include a computer-readable medium or media having computer-readable code embodied therein for causing the machines to perform functions described above. The media may include a computer data signal embodied in a carrier wave and representing sequences of instructions which, when executed by a processor, cause the processor to securely address a peripheral device at an absolute address by performing the method described in this specification. The media ray also include data structures for use in performing the method described in this specification.

Although the illustrative embodiments of the systems consistent with the present invention are described with reference to a computer system implementing the Java programming language on a JVM, the invention is equally applicable to other computer systems processing code from different programming languages. Specifically, the invention may be implemented with both object-oriented and nonobject-oriented programming systems. Also, although an embodiment consistent with the present invention have been described as operating in the Java programming environment, one skilled in the art will appreciate that the present invention can be used in other programming environments as well.

While the present invention has been described in connection with an exemplary embodiment, it will be understood that many modifications will be readily apparent to those skilled in the art, and this application is intended to cover any adaptations or variations thereof. For example, various types of generic code may be used without departing from the scope of the invention. This invention should be limited only by the claims and equivalents thereof.

What is claimed is:

1. A method for remote method invocation in a distributed system comprised of multiple machines, comprising:

receiving a request to invoke a method of an object;

determining the method to be invoked using a generic code, wherein the generic code is not pregenerated;

invoking the method based on the determination; and providing an indication of the invoked method.

2. The method of claim 1 wherein the receiving includes providing an identifier associated with the method.

3. A method for remote method invocation in a distributed object oriented system having multiple machines and defining a plurality of classes, comprising:

receiving a request to invoke a method of an object of a specific class;

determining the method using a common process for all of the classes wherein the common process is not pregenerated;

invoking the method based on the determination; and providing an indication of the invoked method.

4. The method of claim 3 wherein the receiving includes providing an identifier associated with the method.

5. A method for remote method invocation in a distributed system comprised of multiple machines, comprising:

receiving a request to invoke a first method of a first object and a second method of a second object being of a different type from the first object;

determining the first and second methods to be invoked using a common process, wherein the common process is not pregenerated;

invoking the first and second methods based on the determination; and providing an indication of the first invoked method and the second invoked method.

6. An apparatus for remote method invocation in a distributed system comprised of multiple machines, comprising:

a module configured to receive a request to invoke a method of an object;

a module configured to determine the method to be invoked using a generic code, wherein the generic code is not pregenerated;

a module configured to invoke the method based on the determination; and a module configured to provide an indication of the invoked method.

7. The apparatus of claim 6 wherein the receive module includes a module configured to provide an identifier associated with the method.

8. An apparatus for remote method invocation in a distributed system comprised of multiple machines, comprising:

a module configured to receive a request to invoke a method of an object of a specific class;

a module configured to determine the method using a common process for all of the classes, wherein the common process is not pregenerated;

a module configured to invoke the method based on the determination; and a module configured to provide an indication of the invoked method.

9. The apparatus of claim 8 wherein the receive module includes a module configured to provide an identifier associated with the method.

10. An apparatus for remote method invocation in a distributed system comprised of multiple machines, comprising:

a module configured to receive a request to invoke a first method of a first object and a second method of a second object being of a different type from the first object;

a module configured to determine the first and second methods to be invoked using a common process, wherein the common process is not pregenerated;

a module configured to invoke the first and second methods based on the determination; and a module configured to provide an indication of the first invoked method and the second invoked method.

11. A system for transmitting objects in a distributed system comprised of multiple machines, comprising:
a first machine;
a second machine;
a network connecting the first machine with the second machine; and
an apparatus for transmitting objects, the apparatus including:
a module configured to receive a request to invoke a method of an object;
a module configured to determine the method to be invoked using a generic code, wherein the generic code is not pregenerated;
a module configured to invoke the method based on the determination; and
a module configured to provide an indication of the invoked method.

12. The system of claim 11 wherein the receive module includes
a module configured to provide an identifier associated with the method.

13. A system for transmitting objects in a distributed system comprised of multiple machines, comprising:
a first machine;
a second machine;
a network connecting the first machine with the second machine; and
an apparatus for transmitting objects, the apparatus including:
a module configured to receive a request to invoke a method of an object of a specific class;
a module configured to determine the method using a common process for of the classes, wherein the common process is not pregenerated;
a module configured to invoke the method based on the determination; and
a module configured to provide an indication of the invoked method.

14. The system of claim 13 wherein the receive module includes
a module configured to provide an identifier associated with the method.

15. A system for transmitting objects in a distributed system comprised of multiple machines, comprising:
a first machine;
a second machine;
a network connecting the first machine with the second machine; and
an apparatus for transmitting objects, the apparatus including:
a module configured to receive a request to invoke a first method of a first object and a second method of a second object being of a different type from the first object;
a module configured to determine the first and second methods to be invoked using a common process, wherein the common process is not pregenerated;
a module configured to invoke the first and second methods based on the determination; and
a module configured to provide an indication of the first invoked method and the second invoked method.

16. A computer program product, comprising:
a computer-readable medium containing instructions for controlling a computer system to perform a method, the method including:
receiving a request to invoke a method of an object;
determining the method to be invoked using a generic code, wherein the generic code is not pregenerated;
invoking the method based on the determination; and
providing an indication of the invoked method.

17. The computer program product of claim 16 wherein the receiving includes
providing an identifier associated with the method.

18. A computer program product, comprising:
a computer-readable medium containing instructions for controlling a computer system to perform a method, the method including:
receiving a request to invoke a method of an object of a specific class;
determining the method using a common process for all of the classes, wherein the common process is not pregenerated;
invoking the method based on the determination; and
providing an indication of the invoked method.

19. The computer program product of claim 18 wherein the receiving includes
providing an identifier associated with the method.

20. A computer program product, comprising:
a computer-readable medium containing instructions for controlling a computer system to perform a method, the method including:
receiving a request to invoke a first method of a first object and a second method of a second object being of a different type from the first object;
determining the first and second methods to be invoked using a common process, wherein the common process is not pregenerated;
invoking the first method and second methods based on the determination; and
providing an indication of the first invoked method and the second invoked method.

21. An apparatus for remote method invocation in a distributed system comprised of multiple machines, comprising:
means for receiving a request to invoke a method of an object;
means for determining the method to be invoked using a generic code, wherein the generic code is not pregenerated;
means for invoking the method based on the determination; and
means for providing an indication of the invoked method.

22. A distributed system for remote method invocation comprising:
a first module for requesting an invocation of a remote object based on a generic proxy; and
a second module for executing generic code to invoke a remote object corresponding to the invocation request and returning an associated response to the first module.

23. The distributed system of claim 22, wherein the generic proxy is initialized to indicate a plurality of executable methods.

24. A distributed processing system comprising:
a client machine having a remote procedure call module;
a serve machine having a remote object with at least one method;
a network communicably connecting the client machine and the server machine,
wherein when a code executing on the client machine seeks to invoke the method of the remote object, the client remote procedure uses a generic proxy that lacks a specific type to transmit a request to the remote object.

25. A process for invoking remote methods in a network, comprising:

providing a proxy with an invoke method; and upon receipt by the proxy of a call to invoke a method of a remote object of a particular type, passing to the invoke method a method object including information about the remote method to be invoked and any required parameters for processing by the remote method, wherein the proxy lacks a specific type so that it may be used to invoke methods of different types of remote objects.

\* \* \* \* \*

UNITED STATES PATENT AND TRADEMARK OFFICE
CERTIFICATE OF CORRECTION

PATENT NO. : 6,487,607 B1
DATED : November 26, 2002
INVENTOR(S) : Ann M. Wollrath et al.

It is certified that error appears in the above-identified patent and that said Letters Patent is hereby corrected as shown below:

Column 13,
Line 34, "for of the classes," should read -- for all of the classes, --;

Column 14,
Line 62, "a serve machine" should read -- a server machine --; and

Column 15,
Line 1, after "remote procedure", insert -- call module --.

Signed and Sealed this

Twenty-ninth Day of April, 2003

JAMES E. ROGAN
*Director of the United States Patent and Trademark Office*